United States Patent
Forrest et al.

(10) Patent No.: US 10,159,364 B2
(45) Date of Patent: Dec. 25, 2018

(54) PLANAR DISPLAY ASSEMBLY

(71) Applicant: LIBERTY HARDWARE MFG. CORP., Winston-Salem, NC (US)

(72) Inventors: Earl David Forrest, Asheboro, NC (US); Jeffrey John Mathison, Chicago, IL (US); Norman Dax Allen, Asheboro, NC (US); Rubin Thomas Abraham, Winston-Salem, NC (US)

(73) Assignee: LIBERTY HARDWARE MFG. CORP., Winston-Salem, NC (US)

( * ) Notice: Subject to any disclaimer, the term of this patent is extended or adjusted under 35 U.S.C. 154(b) by 180 days.

(21) Appl. No.: 15/004,512

(22) Filed: Jan. 22, 2016

(65) Prior Publication Data
US 2017/0105554 A1    Apr. 20, 2017

Related U.S. Application Data

(60) Provisional application No. 62/243,819, filed on Oct. 20, 2015.

(51) Int. Cl.
| | | |
|---|---|---|
| A47G 1/24 | (2006.01) | |
| A47G 1/16 | (2006.01) | |
| G02B 7/182 | (2006.01) | |

(52) U.S. Cl.
CPC ............ *A47G 1/24* (2013.01); *A47G 1/1686* (2013.01); *G02B 7/182* (2013.01)

(58) Field of Classification Search
CPC .... G02B 5/134; G02B 7/1822; G02B 7/1825; A47G 1/16; A47G 1/1606; A47G 1/1613;
(Continued)

(56) References Cited

U.S. PATENT DOCUMENTS

| | | |
|---|---|---|
| 908,608 A | 1/1909 | Pullen |
| 1,354,270 A | 9/1920 | Wood |

(Continued)

FOREIGN PATENT DOCUMENTS

| | | |
|---|---|---|
| BR | 102012014391 A2 | 6/2014 |
| CN | 201589049 U | 9/2010 |

(Continued)

OTHER PUBLICATIONS

About Smart Mirror Glass, Two Way Mirrors Privacy & Security Products, Product Comparison, 3 pages, Dec. 22, 2015.
(Continued)

*Primary Examiner* — Kimberly N. Kakalec
(74) *Attorney, Agent, or Firm* — Brooks Kushman P.C.; Lora Graentzdoerffer

(57) ABSTRACT

A planar display assembly is provided with a pane with a front reflective surface and a rear surface. An array of mounting plates is provided, each with a first fastener, and a polygonal mounting plate adhered to the rear surface by an adhesive. A plurality of second fasteners is each engaged with one of the array of first fasteners for linear adjustment relative to the pane in a direction generally perpendicular to the pane to support the planar display assembly upon an upright support surface. Each mounting plate is oriented upon the pane rear surface such that at least one vertex extends away from the corresponding first fastener in a direction toward another sequential first fastener within the array of first fasteners. A metal bracket is adapted to be mounted to the upright support surface. The bracket has at least one enclosed cleat to receive two of the second fasteners.

15 Claims, 7 Drawing Sheets

(58) Field of Classification Search
CPC ...... A47G 1/162; A47G 1/1626; A47G 1/166; A47G 1/1666; A47G 1/1686; A47G 1/24
USPC ....... 359/871–883; 248/475.1, 476, 495, 497
See application file for complete search history.

(56) References Cited

U.S. PATENT DOCUMENTS

| | | |
|---|---|---|
| 2,181,874 A | 12/1939 | Cross |
| 2,469,923 A | 5/1949 | Jones |
| 2,696,962 A | 12/1954 | Goss |
| 3,208,876 A | 9/1965 | Dodge |
| 3,274,721 A | 9/1966 | Dreyer |
| 3,283,431 A | 11/1966 | Pearlman |
| 3,471,111 A | 10/1969 | MacDonald |
| 3,471,112 A | 10/1969 | MacDonald et al. |
| 3,501,124 A | 3/1970 | Goss |
| 3,546,802 A | 12/1970 | Preston |
| 3,685,186 A | 8/1972 | Goodman |
| 3,853,226 A * | 12/1974 | Hine ............ A47G 1/1606 211/104 |
| 4,027,413 A | 6/1977 | Moede |
| 4,037,813 A | 7/1977 | Loui et al. |
| 4,053,132 A | 10/1977 | Del Pozzo |
| 4,084,700 A | 4/1978 | Dunchock |
| 4,324,332 A | 4/1982 | Willis |
| 4,432,523 A | 2/1984 | Follows |
| 4,557,457 A * | 12/1985 | Cockfield ............ A47G 1/162 248/220.1 |
| 4,666,117 A | 5/1987 | Taft |
| 4,732,358 A | 3/1988 | Hughes et al. |
| 4,819,901 A | 4/1989 | McDonald |
| D301,413 S | 6/1989 | Rosen |
| 4,991,329 A | 2/1991 | Wilson |
| 5,380,080 A | 1/1995 | Rubin et al. |
| D364,055 S | 11/1995 | Pakla |
| 5,759,045 A | 6/1998 | Gabig et al. |
| 5,761,839 A | 6/1998 | Heikkila |
| 6,186,456 B1 | 2/2001 | Marsh |
| 6,286,802 B1 | 9/2001 | Munson et al. |
| 6,572,943 B2 | 6/2003 | Shaffer |
| 6,964,487 B2 | 11/2005 | Olsen et al. |
| D536,659 S | 2/2007 | Panasewicz et al. |
| 7,337,729 B2 | 3/2008 | Briosi |
| 7,967,400 B1 | 6/2011 | Collum |
| 8,468,767 B1 | 6/2013 | McBride |
| 8,495,830 B2 | 7/2013 | Price |
| D706,064 S | 6/2014 | Ota et al. |
| 9,027,766 B1 | 5/2015 | Serotta et al. |
| D758,771 S | 6/2016 | Austin, III et al. |
| D763,023 S | 8/2016 | Austin, III et al. |
| D799,862 S | 10/2017 | Laumerich et al. |
| 2002/0081409 A1 | 6/2002 | Shaffer |
| 2003/0038222 A1* | 2/2003 | Holmes ............. A47G 1/1606 248/475.1 |
| 2004/0074130 A1* | 4/2004 | Chatterjea ............ A47G 1/16 40/757 |
| 2004/0221772 A1 | 11/2004 | Narkis et al. |
| 2005/0109910 A1 | 5/2005 | Vander Berg et al. |
| 2007/0069358 A1 | 3/2007 | McAllister et al. |
| 2007/0153375 A1 | 7/2007 | Peterson et al. |
| 2008/0023615 A1 | 1/2008 | Scarcello |
| 2008/0078916 A1 | 4/2008 | Nevers et al. |
| 2008/0148692 A1 | 6/2008 | Wisecarver et al. |
| 2008/0216374 A1 | 9/2008 | Ozmun |
| 2008/0236053 A1 | 10/2008 | Adams et al. |
| 2008/0237434 A1* | 10/2008 | Lin .................. F16B 43/00 248/497 |
| 2008/0251413 A1 | 10/2008 | Blumenau-Bebry |
| 2009/0294610 A1* | 12/2009 | Paharik ............ A47G 1/1606 248/220.21 |
| 2010/0060807 A1 | 3/2010 | Green et al. |
| 2010/0140428 A1 | 6/2010 | Vassallo |
| 2010/0229442 A1 | 9/2010 | Snow et al. |
| 2010/0276562 A1 | 11/2010 | Nguyen |
| 2011/0266406 A1 | 11/2011 | Westimayer et al. |
| 2011/0271571 A1 | 11/2011 | Lennard |
| 2012/0030978 A1 | 2/2012 | Miller |
| 2012/0032062 A1 | 2/2012 | Newville |
| 2012/0103982 A1 | 5/2012 | McDonald et al. |
| 2012/0144708 A1 | 6/2012 | Schwartz |
| 2012/0145847 A1 | 6/2012 | Wang |
| 2012/0222341 A1 | 9/2012 | Tucker |
| 2012/0260549 A1 | 10/2012 | Andrulewich |
| 2012/0306188 A1 | 12/2012 | Chen |
| 2013/0026319 A1* | 1/2013 | Crescenzo ............. A47G 1/16 248/216.4 |
| 2013/0048812 A1 | 2/2013 | Lozano |
| 2013/0112637 A1 | 5/2013 | Kuhn |
| 2013/0180142 A1 | 7/2013 | Kressin et al. |
| 2013/0256476 A1 | 10/2013 | Ripke |
| 2013/0256487 A1 | 10/2013 | Ko |
| 2013/0269170 A1 | 10/2013 | Goldberg |
| 2013/0321715 A1 | 12/2013 | Millson et al. |
| 2013/0325670 A1 | 12/2013 | Austin, III et al. |
| 2014/0030490 A1 | 1/2014 | Crosby et al. |
| 2014/0231611 A1 | 8/2014 | Svihilik |
| 2014/0263923 A1 | 9/2014 | McKinney |
| 2014/0291460 A1 | 10/2014 | Warncke et al. |
| 2015/0071475 A1 | 3/2015 | Hose et al. |
| 2015/0075146 A1 | 3/2015 | Skinner |
| 2015/0269875 A1 | 9/2015 | Corcoran et al. |
| 2015/0272352 A1 | 10/2015 | Chowdhury et al. |
| 2015/0335152 A1 | 11/2015 | Buettner |
| 2016/0007742 A1 | 1/2016 | Yang |

FOREIGN PATENT DOCUMENTS

| | | |
|---|---|---|
| CN | 201764226 U | 3/2011 |
| CN | 203857240 U | 10/2014 |
| CN | 204114511 U | 1/2015 |
| CN | 204141192 U | 2/2015 |
| DE | 102012100562 A1 | 7/2013 |
| GB | 2508404 A | 6/2014 |
| KR | 2020110007036 | 7/2011 |
| KR | 2020120006811 | 10/2012 |

OTHER PUBLICATIONS

The Source for Fine Art, "Glass Vs. Acrylic: Demystifying Glazing", 4 pages, Jan. 10, 2015.

Andscot Company, Inc., "Hang-It Brochure", 2 pages, Applicant Admitted Prior Art.

"Hangman® Wall Mounting Hardware", Ace Hardware, 3 pages, Applicant Admitted Prior Art.

"Decor Wonderland SSM13 Houston Modern Frameless Mirror", 6 pages, Applicant Admitted Prior Art.

"Rectangle Wall Mirror Frameless Beveled 24" X 36", Hook Included", Amazon.com, 24 pages, Applicant Admitted Prior Art.

* cited by examiner

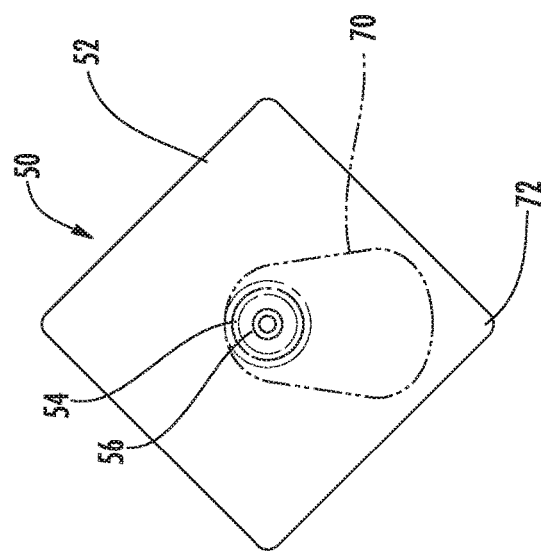
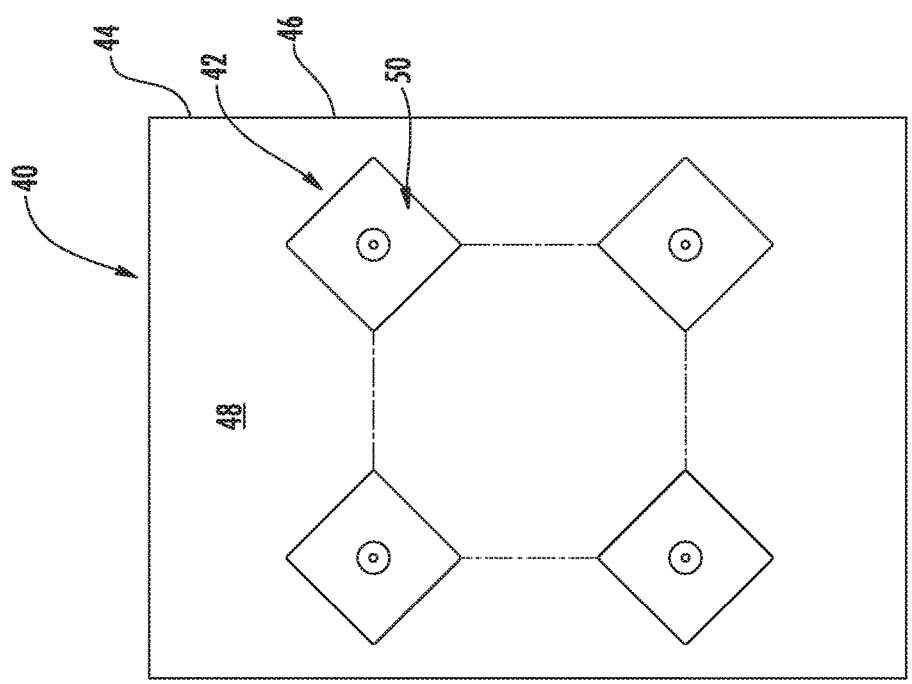

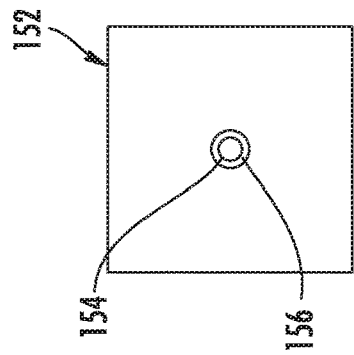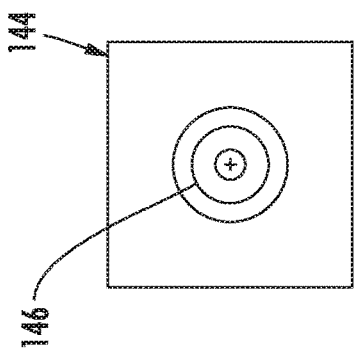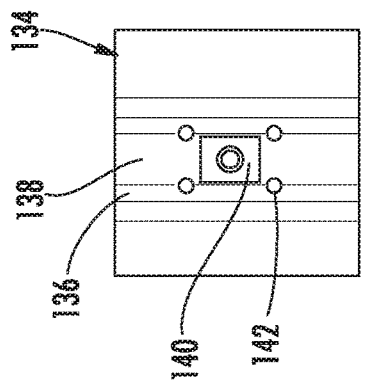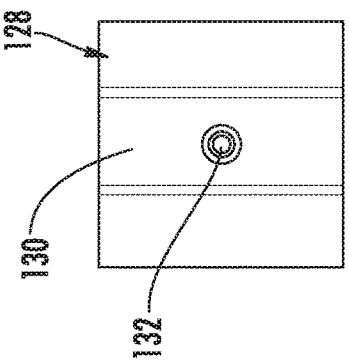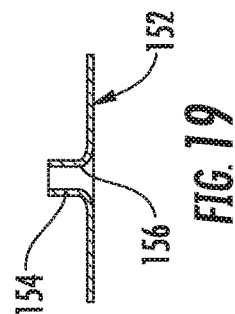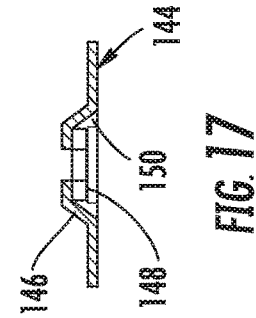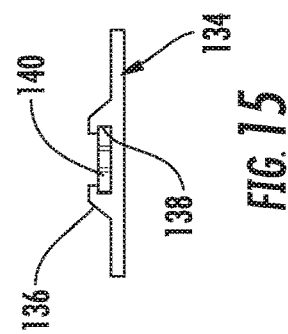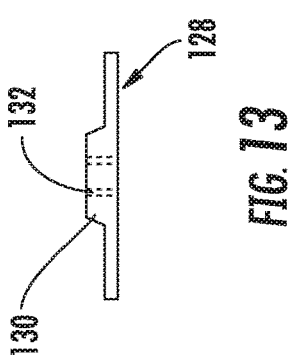

PLANAR DISPLAY ASSEMBLY

CROSS-REFERENCE TO RELATED APPLICATIONS

This application claims the benefit of U.S. provisional application Ser. No. 62/243,819 filed Oct. 20, 2015, the disclosure of which is hereby incorporated in its entirety by reference herein.

TECHNICAL FIELD

Various embodiments relate to planar display assemblies.

BACKGROUND

One prior art system for installing a mirror assembly to an upright support surface includes a cleat assembly, commonly referred to as a French cleat with one horizontal cleat mounted to the upright support surface, and another horizontal cleat mounted to a rear surface of the mirror assembly. An elastomeric bumper may be mounted to a lower region of the rear surface to engage the upright support surface to ensure that the mirror assembly is vertically upright or level by being spaced parallel to the wall.

Typically, hidden fastener mirrors include a sheet metal mounting plate which is positioned onto the back of the mirror where the vertical and horizontal axis of the mounting plates are roughly parallel with the vertical and horizontal axis of the mirror to which they are attached.

SUMMARY

According to at least one embodiment, a planar display assembly is provided with a pane with a front reflective surface and a rear surface. An array of first fasteners is fastened to the rear surface of the pane. A plurality of second fasteners engages the array of first fasteners for linear adjustment relative to the pane in a direction generally perpendicular to the pane to support the planar display assembly upon an upright support surface.

According to at least another embodiment, a planar display assembly is provided with a pane with a front reflective surface and a rear surface. An array of mounting plates is provided, each formed generally as a polygon. Each of the plurality of mounting plates is adhered to the rear surface of the pane by an adhesive. A plurality of first fasteners is each provided on one of the array of mounting plates. A plurality of second fasteners is each engaged with one of the plurality of first fasteners to support the planar display assembly upon an upright support surface. Each mounting plate is oriented upon the pane rear surface such that at least one vertex extends away from the corresponding first fastener in a direction toward another sequential first fastener within the array of first fasteners.

A planar display assembly is provided with a pane with a front reflective surface and a rear surface. An array of first fasteners is fastened to the rear surface of the pane. A plurality of second fasteners is each engaged with one of the array of first fasteners for linear adjustment relative to the pane in a direction generally perpendicular to the pane to support the planar display assembly upon an upright support surface. A metal bracket is adapted to be mounted to the upright support surface. The bracket has at least one cleat sized to receive at least two of the plurality of second fasteners. The cleat is enclosed at adjacent terminal ends of the bracket due to a deformation of the bracket to limit a lateral range of adjustment of the planar display assembly.

BRIEF DESCRIPTION OF THE DRAWINGS

FIG. 1 is a rear elevation view of a mirror assembly according to an embodiment;

FIG. 2 is a rear elevation view of a mounting plate assembly of the mirror assembly of FIG. 1;

FIG. 12 is a front elevation view of a mounting plate according to another embodiment;

FIG. 13 is a bottom plan view of the mounting plate of FIG. 12;

FIG. 14 is a front elevation view of a mounting plate assembly according to another embodiment;

FIG. 15 is a bottom plan view of the mounting plate assembly of FIG. 14;

FIG. 16 is a front elevation view of a mounting plate assembly according to another embodiment;

FIG. 17 is a bottom section view of the mounting plate assembly of FIG. 16;

FIG. 18 is a front elevation view of a mounting plate according to another embodiment;

FIG. 19 is a bottom section view of the mounting plate of FIG. 18;

DETAILED DESCRIPTION

Figure 4:
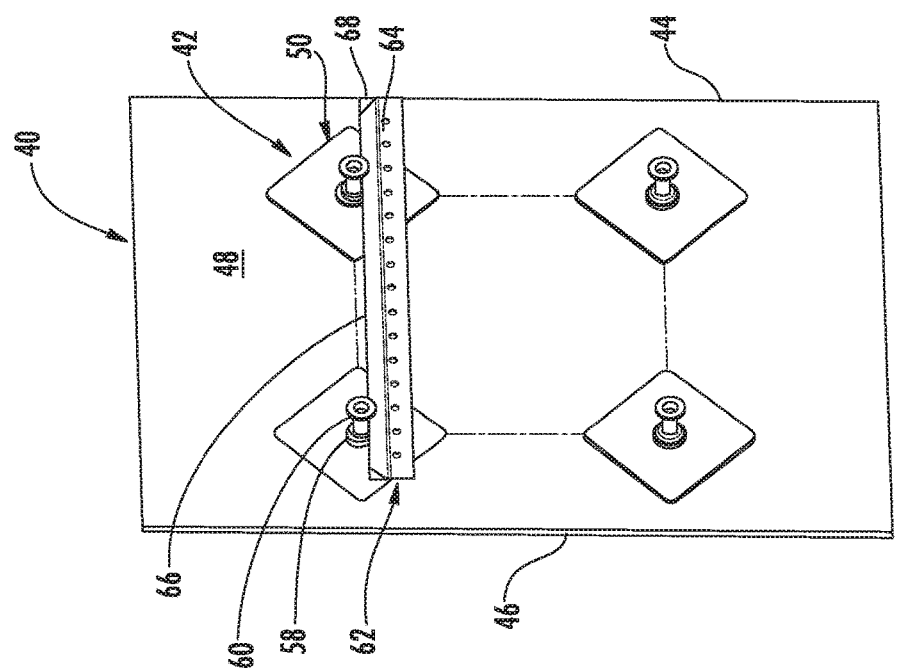
FIG. 4 is a rear perspective view of the mirror assembly of FIG. 1, illustrated assembled to an upright support surface.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference now to FIG. 1, a planar display assembly, such as a mirror assembly is illustrated and referenced generally by numeral 40. The mirror assembly 40 is depicted as a rear elevation view to expose components of a hardware assembly 42 for mounting the mirror assembly 40 to an upright support surface, such as a wall. Although a mirror assembly 40 is illustrated, any planar display assembly, such as a picture, is contemplated that can be installed with the hardware assembly 42.

The mirror assembly includes a mirror pane 44, with front display surface 46 and a rear surface 48 which may be non-reflective. The mirror pane 44 may be laminated to include a hardboard backer on the rear surface 48. Although the mirror assembly 40 is depicted as frameless, the mounting hardware assembly 42 may be employed with a framed mirror assembly as well. The hardware assembly 42 is oriented within a perimeter of the mirror assembly 40 to avoid or minimize the visibility of the hardware assembly 42.

Figure 3:
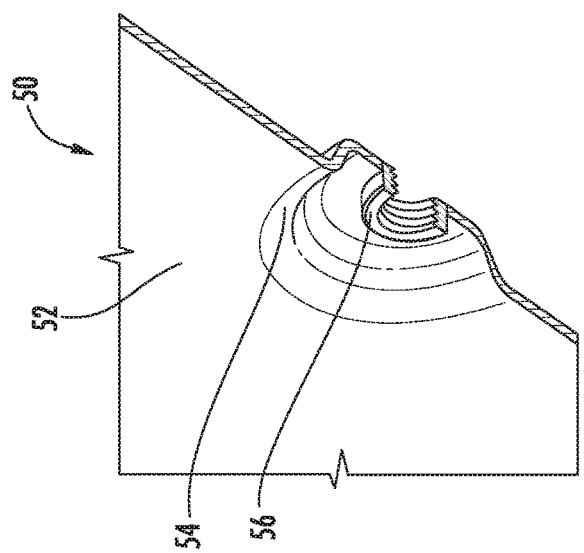
FIG. 3 is a perspective section view of the mounting plate assembly of FIG. 2.

The hardware assembly 42 includes a rectangular array of mounting plate assemblies 50 fastened to the rear surface 48 of the mirror assembly 40. One of the mounting plate assemblies 50 is illustrated in greater detail in FIGS. 2 and 3. The mounting plate assembly 50 includes a substrate or mounting plate 52, which may be formed from stamped sheet metal or any suitable structural material. A boss 54 is formed into the mounting plate 52 to provide an aperture and clearance for receipt of a threaded fastener, such as a self-clinching internally threaded insert 56. The boss 54 in combination with the threaded insert 56 provide a robust connection point that is sufficiently compact to permit the mirror assembly 40 to be installed upon a wall with minimal spacing or gap between the wall and the mirror assembly 40. Other internally threaded fasteners are contemplated such as a welded nut, or the like.

With reference to FIG. 4, the hardware assembly 42 is illustrated with a plurality of externally threaded fasteners, or studs 58 with enlarged diameter heads, such as frustoconical fastener heads 60. Each one of the studs 58 is in threaded engagement with one of the threaded inserts 56 in a direction that is perpendicular to the mirror pane 44. Linear adjustment, or spacing, of the mirror assembly 40 from the support wall can be accomplished by employing studs 58 of varying lengths. According to at least one embodiment, the adjustment of the spacing is provided by adjusting the stud 58.

With continued reference to FIG. 4, the hardware assembly 42 includes a bracket 62 with an array of apertures 64. The apertures 64 permit an end user to install the bracket 62 to the wall. For example, during installation, the bracket 62 is fastened to the wall with at least one fastener being installed through one of the apertures 64 and into a wood wall stud. Once the bracket 62 is level, the installer then uses a plurality of additional fasteners to prevent rotation of the bracket 62 during normal use.

The bracket 62 also includes a cleat 66 that extends upward and angled away from the wall. The cleat 66 is sized and angled to receive the heads 60 of at least a pair of the studs 58 to support the mirror assembly upon the wall. The studs 58 may be tightened by hand for convenience so that no tools are required. The lower studs 58 may be extended to engage the wall and level the mirror assembly 40 relative to vertical. If the loading requirements of a particular mirror assembly require additional support, a second bracket 62 can be provided for the lower studs 58. The interchangeability and adjustability of the studs 58 permits a user to adjust the spacing of the mirror assembly 40 relative to the wall for a range of positions including proximate to the wall to a standoff position relative to the wall. Alternatively, the hardware assembly 42 can be utilized for framed mirror assemblies 40 with a variety of frame thicknesses.

The cleat 66 permits a lateral range of adjustment of the mirror assembly 40 so that the installer or end user can adjust the position of the mirror assembly laterally. The cleat 66 includes a pair of deformations 68 to enclose the cleat at its terminal ends and provide a mechanical limit or stop to the range of lateral adjustment. The spacing of the deformations 68 is greater than a spacing of the threaded inserts 56 to provide the range of adjustment. The deformations 68 are bent or formed to return towards the wall to enclose the cleat 66 and prevent one of the stud heads 60 from inadvertently disengaging the cleat 66 during lateral adjustment, cleaning or the like.

Referring again to FIG. 1, the mounting plate assemblies 50 are positioned in a symmetrical pattern relative to a height and width of the mirror assembly 40. In other words, the distance from the center of one sequential mounting plate assembly 50 to a sequential mounting plate assembly 50 is the same in both horizontal and vertical directions. In other words, the mounting plate assemblies are arranged in a rectangular pattern, such as a square pattern, with the threaded insert 56 at each vertex of the square. The square pattern of the mounting plate assemblies 50 is also centered in the mirror pane 44. This arrangement gives the installer the option of positioning the mirror assembly 40 either vertically or horizontally;

The adjustability of the mirror assembly 40 provides options to the installer that allows the mirror assembly 40 to be installed in close proximity to the wall surface as well as offset from the wall surface. In other words, these positions could be thought of as flush and floating respectively. The adjustable mirror assembly 40 also allows the mirror to be attached to a pair of drawer slides, a cabinet, and hinges.

Typically, hidden fastener mirror assemblies are provided with a sheet metal mounting plate which is positioned onto the back of the mirror where the vertical and horizontal axis of the mounting plates are roughly in alignment with the vertical and horizontal axis of the mirror to which they are attached. This approach does not optimize the amount of adhesive being used to attach the plate to the mirror assembly.

Referring again to FIG. 2, each mounting plate 52 provides a flange for applying adhesive for fastening each mounting plate assembly 50 the rear surface 48 of the mirror assembly 40. In the depicted embodiment of FIG. 4, the studs 58 absorb the weight of the mirror assembly 40 whereas a portion above or below the center axis of the stud 58 is in tension while the other portion on the opposite side of the center axis is in compression. This loading is reversed on applications where the fastener arrangement (internally and externally threaded) is reversed. The result of this loading creates an "area of influence" 70 (FIG. 2) wherein the greatest tensile stresses are applied to the adhesive.

In order to optimize the surface area of the adhesive and the surface area of the mounting plate 52, the mounting plate 52 is formed generally as a polygon, such as a square rotated approximately forty-five degrees. This orientation aligns each vertex 72 in a direction away from the threaded insert 56 and aligned with a sequential mounting plate assembly 50. This orientation maintains the area of influence 70 within the area of the mounting plate 52 and adhesive for any of all four potential mounting orientations of the mounting plate assembly 50.

Figure 5:
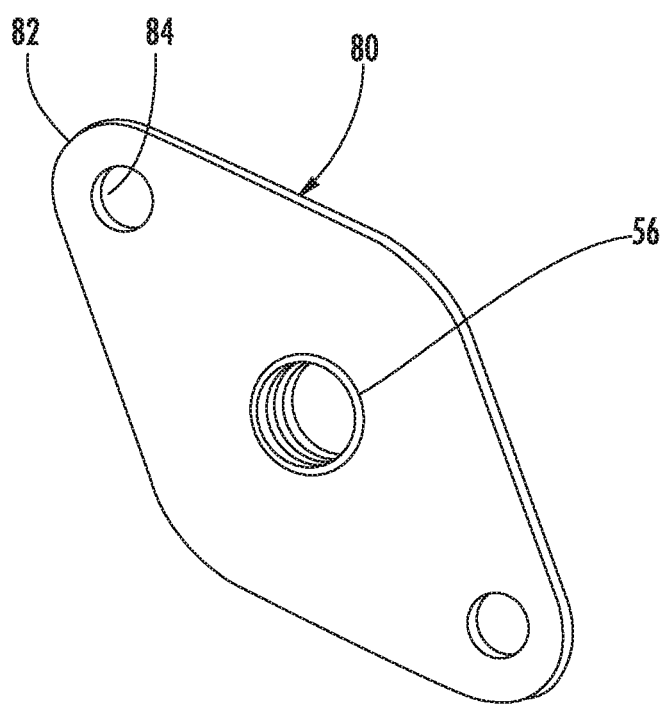
FIG. 5 is a perspective view of a mounting plate assembly according to another embodiment.

With reference to FIG. 5, a mounting plate assembly 80 is illustrated according to another embodiment. The mounting plate assembly 80 includes a mounting plate 82 with a threaded insert 56. A pair of apertures 84 is formed through the mounting plate 82 to receive mechanical fasteners for securing the mounting plate 82 to the rear surface 48 of the mirror assembly 40. This embodiment may be employed for mirror panes 44 that are laminated to a hardboard backing. The fastener may be a lower profile head rivet, or the like.

Figure 6:
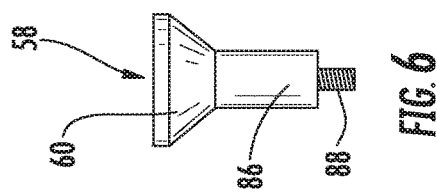
FIG. 6 is a side elevation view a fastener of the assembled mirror assembly of FIG. 4, according to an embodiment.

The stud 58 is illustrated in greater detail in FIG. 6. The stud 58 includes a shank 86 extending from the fastener head 60. A threaded body 88 extends from the shank 86 to engage one of the threaded inserts 56. The stud may be turned, or formed from any suitable manufacturing process.

Figure 7:
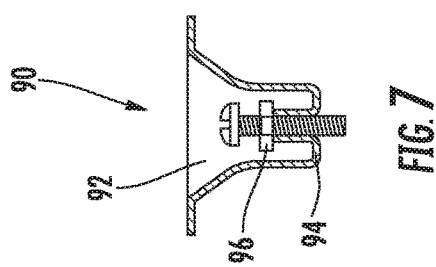
FIG. 7 is a side section view of a fastener assembly according to an embodiment.

FIG. 7 illustrates a fastener assembly 90 according to an alternative embodiment. A stamped fastener head 92 is in threaded engagement with a machine screw 94. A jam nut 96 is employed for locking the machine screw 94 relative to the fastener head 92. The machine screw 94 engages the threaded insert 56 of the corresponding mounting plate assembly 50.

Figure 8:
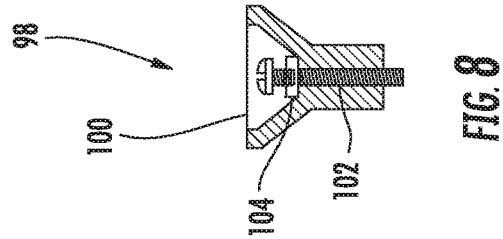
FIG. 8 is a side section view of a fastener assembly according to another embodiment.

FIG. 8 illustrates a fastener assembly 98 according to an alternative embodiment. A cast fastener head 100 is in threaded engagement with a machine screw 102. A jam nut 104 is locks the machine screw 102 relative to the fastener head 100. The machine screw 102 engages the threaded insert 56 of the corresponding mounting plate assembly 50.

The length of the stud 58 determines the distance that the mirror assembly 40 is spaced apart from the surface of the wall. Different length studs 58 are offered so that installers have options for either a flush mount or floating effect simply by changing out the studs 58 to accommodate the desired style. For any given application, at least two studs 58 engage the cleat 66, while the other two studs 58 provide both overall stability and ensure the mirror rear surface 48 is equidistant and parallel from the wall surface.

For larger mirror assemblies, more than two mounting plate assemblies 50 and studs 58 may engage the cleat 66. This equidistant mounting approach ensures the reflected image is parallel and true to the wall and the surroundings.

Figure 9:
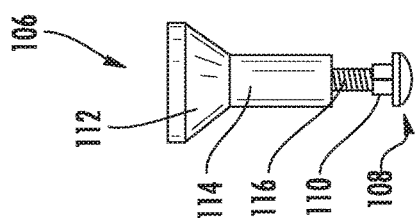
FIG. 9 is a side elevation view a fastener assembly according to another embodiment.

FIG. 9 illustrates a fastener assembly 106 according to another embodiment. The fastener assembly 106 includes a carriage bolt 108 with a wrench flat 110 that is received within a corresponding mounting plate. A turned fastener head 112 is provided with an internally threaded shank 114 to operate as a nut and receive a threaded body 116 of the carriage bolt 108.

Figure 10:
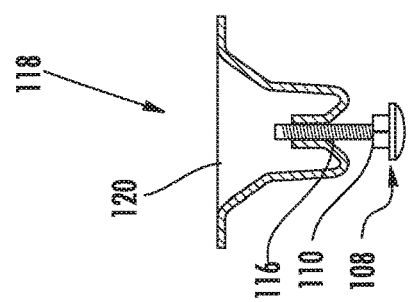
FIG. 10 is a side section view of a fastener assembly according to another embodiment.

FIG. 10 illustrates a fastener assembly 118 according to another embodiment. The fastener assembly 118 includes a carriage bolt 108 with a wrench flat 110 that is received within a corresponding mounting plate. A stamped fastener head 120 is internally threaded to operate as a nut and receive a threaded body 116 of the carriage bolt 108.

Figure 11:
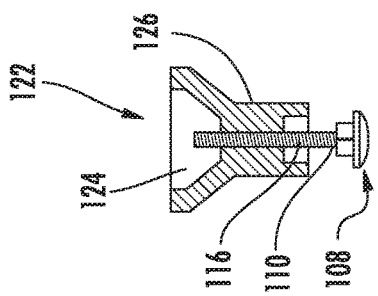
FIG. 11 is a side section view of a fastener assembly according to another embodiment.

FIG. 11 illustrates a fastener assembly 122 according to another embodiment. The fastener assembly 122 includes a carriage bolt 108 with a wrench flat 110 that is received within a corresponding mounting plate. A cast fastener head 124 is provided with an internally threaded shank 126 to operate as a nut and receive a threaded body 116 of the carriage bolt 108.

FIGS. 12 and 13 illustrate a mounting plate 128 according to another embodiment. The mounting plate 128 is formed from extruded aluminum with a continuous boss 130 across a material length of the mounting plate 128. A threaded aperture 132 is formed through a center of the mounting plate 128.

FIGS. 14 and 15 illustrate a mounting plate 134 according to another embodiment. The mounting plate 134 is formed from extruded aluminum with a pair of continuous retainer gibs 136 formed across a material length of the mounting plate 134 providing a channel 138. An internally threaded nut 140 is oriented within the channel 138. The gibs 136 are deformed or swedged at locations 142 to retain the nut 140 in a central orientation.

FIGS. 16 and 17 illustrate a stamped mounting plate 144 according to another embodiment. The mounting plate 144 is stamped with an integral boss 146. An internally threaded nut 148 is welded into the boss 146 by at welds 150.

FIGS. 18 and 19 illustrate a stamped mounting plate 152 according to another embodiment. The mounting plate 152 is stamped with an integral boss 154. An internally threaded aperture 156 is formed through the boss 154.

Figure 20:
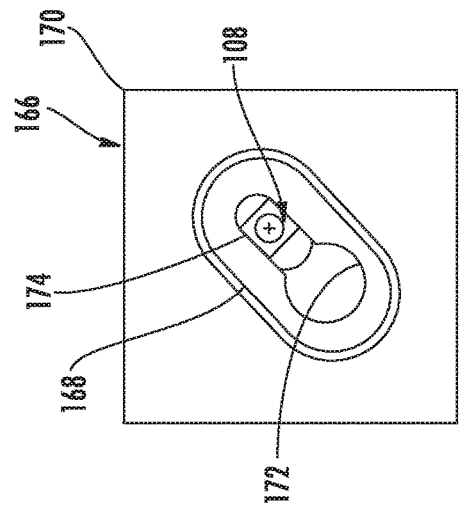
FIG. 20 is a front elevation view of a mounting plate assembly according to another embodiment.
Figure 21:
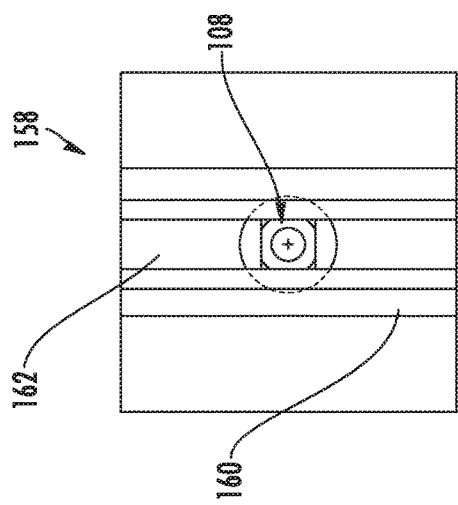
FIG. 21 is a bottom plan view of the mounting plate assembly of FIG. 20.

FIGS. 20 and 21 illustrate a mounting plate 158 according to another embodiment. The mounting plate 158 is formed from extruded aluminum with a pair of continuous retainer gibs 160 formed across a material length of the mounting plate 158 providing a channel 162. A fastener head 164 of a carriage bolt 108 is oriented within the channel 162. The carriage bolt 108 is engaged with one of the fastener assemblies 106, 118, 122 of the embodiments of FIGS. 9-11. The carriage bolt 108 arrangement provides another level of adjustability along the channel 162 for assisting in levelling the mirror assembly 40.

Figure 22:
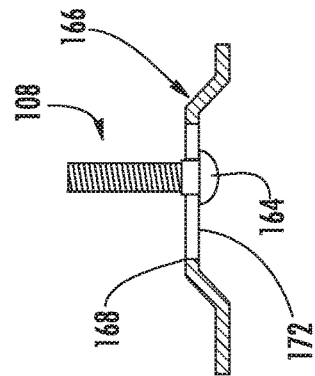
FIG. 22 is a front elevation view of a mounting plate assembly according to another embodiment.
Figure 23:
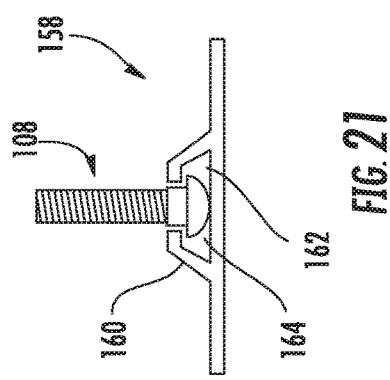
FIG. 23 is a side section view of the mounting plate assembly of FIG. 22.

FIGS. 22 and 23 illustrate a mounting plate 166 according to another embodiment. The mounting plate 166 is formed from stamped steel with an integral elongate boss 168 extending toward an opposed pair of vertices 170 of the mounting plate 166. An aperture 172 is formed through the boss 168 and sized to pass a fastener head 164 of a carriage bolt 108. A slot 174 is formed through the boss intersecting the aperture 172 for receiving the threaded body 116 of the carriage bolt 108. The carriage bolt 108 received within the slot 174 provides adjustability along the slot 174 for assisting in levelling the mirror assembly 40 in a height direction.

Figure 24:
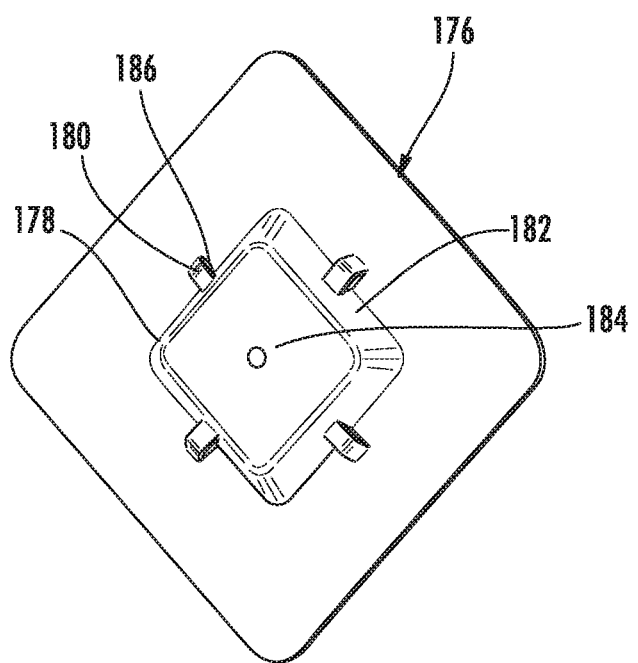
FIG. 24 is a front perspective view of a mounting plate according to another embodiment.

FIG. 24 illustrates a mounting plate 176 according to another embodiment. The mounting plate 176 is stamped from metal with a boss 178 that is frusto-pyramidal. A plurality of supports 180 are stamped into each lateral side 182 of the boss 178. A threaded aperture 184 is formed through the boss 178. Alternatively, a nut or threaded insert is retained within the boss 178.

The plurality of supports 180 are formed away from the corresponding lateral sides 182 of the boss 178 and from the mounting plate 176. This integral loop configuration of the supports 180 consequently provides an aperture 186 between each support 180 and the intersection of the corresponding lateral side 182 and the mounting plate 176. The support apertures 186 permit a user to pass a thin wire through apertures 186 of a pair of mounting plates 176. A wire may be employed for hanging the mirror assembly 40. For example, if a user desires to utilize a traditional picture hanging hook, the hardware assembly 42 is compatible for that use. This compatibility may be advantageous when the mirror assembly 40 is replacing a preexisting mirror assembly; and wherein the user desires to utilize a common picture hanging hook. Alternatively, the wire may be employed to hang the mirror assembly 40 from a conventional open-ended French cleat, screw, nail or the like.

The mirror assembly 40 permits spacing of the display surface 46 from the wall so that the gap behind the mirror assembly 40 is constant. Also, by providing four points of contact with the wall, the mirror assembly 40 is stable and holds the mirror assembly 40 steady while during cleaning of the mirror assembly 40. Alternatively the hardware assembly 42 may be utilized to install the mirror assembly 40 to a pair of common ball bearing drawer slides in order to move the mirror assembly 40 to one side and thus gain access to the wall surface behind the mirror assembly 40 where a storage compartment may be embedded within the wall for storing medicine or valuables.

Spacing of the mirror assembly 40 away from the wall in bathroom environments minimizes moisture buildup behind the mirror assembly 40, which can be a source of premature mirror decay. When the mirror assembly 40 is installed in such a way that it rests directly onto the wall, chemical cleaners can wick behind the mirror assembly 40 and erode or corrode the silver or aluminum reflective surface. The fastening system 42 provides adequate spacing to allow water and cleaners to quickly dissipate, thereby preserving the mirror assembly 40.

The foot print size of the various mirror mounting plates 52, 82, 128, 134, 144, 152, 158, 166, 176 are sized and/or proportioned to accommodate the size and weight of the mirror assembly 40 being installed for each application. This approach optimizes both the material for the mounting plate 52, 82, 128, 134, 144, 152, 158, 166, 176 and the quantity of the adhesive being employed.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A planar display assembly comprising:
   a pane with a front display surface and a rear surface;
   an array of first fasteners fastened to the rear surface of the pane; and
   a plurality of second fasteners to each engage one of the array of first fasteners for linear adjustment relative to the pane in a direction generally perpendicular to the pane to support the planar display assembly upon an upright support surface;
   wherein the array of first fasteners further comprises an array of mounting plates each fastened to the rear surface of the pane;
   an adhesive that adheres each mounting plate of the array of mounting plates to the rear surface of the pane;
   wherein the array of first fasteners is aligned in a rectangular pattern with at least one first fastener oriented at each vertex; and
   wherein the mounting plate is formed generally as a square rotated generally forty-five degrees from the rectangular pattern of the array.

2. The planar display assembly of claim 1 wherein the array of mounting plates comprises an array of first threaded fasteners; and
   wherein the plurality of second fasteners comprises a plurality of second threaded fasteners.

3. The planar display assembly of claim 2 wherein the array of first threaded fasteners further comprises an array of internally threaded fasteners.

4. The planar display assembly of claim 3 wherein the plurality of second threaded fasteners further comprises a plurality of externally threaded fasteners.

5. The planar display assembly of claim 2 wherein the array of first threaded fasteners further comprises an array of carriage bolts.

6. The planar display assembly of claim 5 wherein the plurality of second threaded fasteners further comprises a plurality of threaded nuts.

7. The planar display assembly of claim 1 further comprising a plurality of mechanical fasteners fastened to one of the array of mounting plates and the rear surface of the pane.

8. The planar display assembly of claim 1 wherein each mounting plate of the array of mounting plates is formed generally as a polygon and oriented upon the rear surface of the pane such that at least one vertex extends away from the corresponding first fastener in a direction toward another sequential first fastener within the array of first fasteners.

9. The planar display assembly of claim 1 wherein each mounting plate of the array of mounting plates is formed generally as a polygon and oriented upon the rear surface of the pane such that at least two vertices each extend away from the corresponding first fastener in a direction toward another sequential first fastener within the array of first fasteners.

10. The planar display assembly of claim 1 further comprising a bracket adapted to be mounted to the upright support surface, with only one continuous cleat sized to receive at least two of the plurality of second fasteners.

11. The planar display assembly of claim 10 wherein the cleat is enclosed at adjacent terminal ends of the bracket to limit a lateral range of adjustment of the planar display assembly.

12. A planar display assembly comprising:
    a pane with a front reflective surface and a rear surface;
    an array of mounting plates, each formed generally as a polygon, and adhered directly to the rear surface of the pane by an adhesive;
    a plurality of first fasteners each provided on one of the array of mounting plates; and
    a plurality of second fasteners to each engage one of the plurality of first fasteners to support the planar display assembly upon an upright support surface;
    wherein each mounting plate is oriented upon the rear surface of the pane such that at least one vertex extends away from the corresponding first fastener in a direction toward another sequential first fastener within the plurality of first fasteners; and
    wherein the plurality of first fasteners is aligned in a rectangular pattern with at least one first fastener oriented at each vertex.

13. A planar display assembly comprising:
    a pane with a front reflective surface and a rear surface;
    an array of first fasteners fastened directly to the rear surface of the pane;
    a plurality of second fasteners each engaged with one of the array of first fasteners for linear adjustment relative to the pane in a direction generally perpendicular to the pane to support the planar display assembly upon an upright support surface; and
    a metal bracket adapted to be mounted to the upright support surface, with at least one cleat sized to receive at least two of the plurality of second fasteners, wherein the cleat is enclosed at adjacent terminal ends of the bracket due to a deformation of the bracket to limit a lateral range of adjustment of the planar display assembly.

14. The planar display assembly of claim 13 wherein each of the plurality of second fasteners further comprise an enlarged diameter sized to be received within the cleat.

15. The planar display assembly of claim 13 wherein the planar display assembly is frameless.

\* \* \* \* \*